Patented Feb. 19, 1952

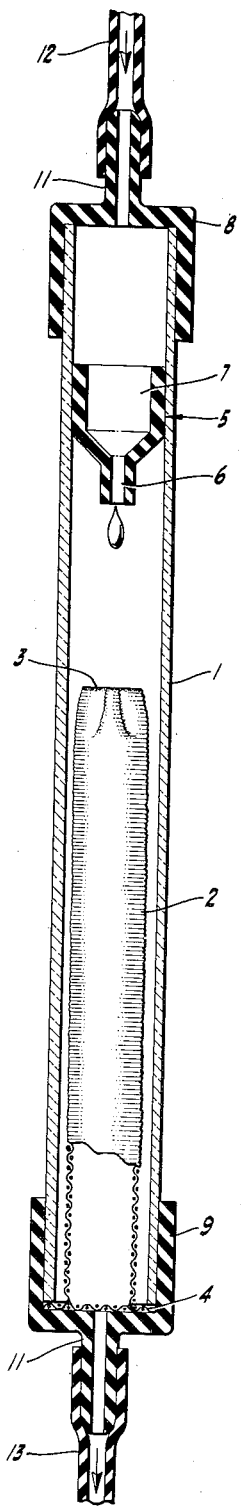

2,586,513

UNITED STATES PATENT OFFICE 2,586,513

BLOOD FILTER AND DRIP METER

William F. Butler, Oakland, Calif., assignor to Cutter Laboratories, Berkeley, Calif., a corporation of California Application November 16, 1948, Serial No. 60,322

3 Claims. (Cl. 210—164)

This invention relates in general to blood transfusion equipment and more particularly to a combination blood filter and drip meter particularly adapted for administering blood transfusions.

Blood, blood plasma, and intravenous solutions must be administered under aseptic conditions and consequently all equipment designed for this purpose must be sterilized prior to use. Much equipment of this type is of a permanent nature and consequently after each use it must be thoroughly washed and sterilized preparatory to its subsequent re-use.

In general the object of this invention is the provision of a combination blood filter and drip meter that can be disposed of after it has been used, thus avoiding the time and care which would be required in sterilizing it for re-use.

More specifically, the object of this invention is the provision of a combination blood filter and drip meter consisting of a glass tube containing a form-sustaining filter tube held in place at one end of the glass cylinder by a rubber cap, sealed at its other end by an identical rubber cap, both caps being provided with outwardly extending connecting nipples and within which which is fitted a rubber nipple serving as a drip meter.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

The single figure shown in the drawing attached and forming a part hereof is a vertical mid-section taken through a combination blood filter and drip meter embodying the objects of my invention.

The combination blood filter and drip meter shown in these drawings comprises a glass cylinder 1 designed to assume a substantially vertical position when in actual use. Inserted within the lower end of the cylinder 1 is a form-sustaining filter tube 2 preferably made of a nylon fabric tube and having its upper end 3 flame-sealed. Flame-sealed to the lower end of the filter tube 2 is a nylon fabric disc 4 made of a diameter substantialy equal to the outer diameter of the glass cylinder 1. Preferably the outer diameter of the filter tube 2 is substantially smaller than the inner diameter of the filter cylinder 1.

Inserted in the upper end of the glass cylinder 1 is a rubber nipple 5 formed with an axial aperture 6 merging at its upper end in a cup-shaped blood receiving recess 7. Sealed respectively over the upper and lower ends of the cylinder 1 are rubber caps 8 and 9 each provided with outwardly extending connecting nipples 11. The floor of the cap 9 abuts the nylon disc 4 and serves to hold it in engagement with the lower end of the glass cylinder 1.

Connected to the nipple 11 of the upper cap 8 is a section 12 of rubber tubing arranged to communicate with a flask containing the blood, plasma or intravenous solution to be administered, and connected to the nipple 11 of the lower cap 9 is a section 13 of rubber tubing to the lower end of which is fastened a hypodermic needle for insertion into the body of a patient.

In the use of this device, blood or other solution from the flask flows through the rubber tubing 12 and into the cup 7 of the nipple 5. In passing through the aperture 6 which is of a restricted size, the blood or other solution forms drops readily visible through the walls of the cylinder 1 and which therefore give an indication to the physician or operator as to the rate at which he is permitting the blood or other solution to get to the patient. The drops of blood from the nipple 5 gradually fill and partially fill the cylinder 1 about the filter tube 2 and pass through the cylinder, through the nipple 11 of the lower cap 9, and into the tubing 13. Any clots or other solid matter contained in the liquid are retained on the outer surface of the filter tube 2 thereby ensuring that no such particles get into the blood stream or body of the patient.

From the above description it will be seen that I have provided a combination blood filter and drip meter which is of such simple construction and so inexpensive that it can be disposed of after having been used once. By resorting to this type of equipment, the dangers involved in sterilizing other types of equipment are avoided, as well as the time required in doing so.

I claim:

1. A blood transfusion filter of the character described comprising: a blood inert, transparent cylinder; a filter disc seated over one end of said cylinder; a form-sustaining filter tube fastened at its outer end to said disc and extending into said cylinder substantially coaxially therewith, the outer diameter of said tube being substantially smaller than the inner diameter of said cylinder and the inner end of said tube being closed; a resilient cap disposed over each end of said cylinder in sealing engagement therewith, each of said caps being provided with a concentric outwardly extending connecting nipple formed with an axial passageway.

2. A blood transfusion filter of the character described comprising: a transparent cylinder; a filter disc seated over the lower end of said cylinder; a form-sustaining filter tube fastened at its lower end to said disc and extending into said cylinder substantially coaxially therewith, the outer diameter of said tube being substantially smaller than the inner diameter of said cylinder, and the upper end of said tube being closed; a resilient cap sealed over the upper and lower ends of said cylinders, each of said caps being provided with outwardly extending connecting nipples.

3. A filter such as defined in claim 2 wherein a resilient nipple is sealed within said cylinder.

WILLIAM F. BUTLER.

REFERENCES CITED

The following references are of record in the file of this patent:

UNITED STATES PATENTS

| Number | Name | Date |
|---|---|---|
| 1,458,464 | Byers | June 12, 1923 |
| 2,168,270 | Paisley et al. | Aug. 1, 1939 |
| 2,186,987 | Nesset | Jan. 16, 1940 |
| 2,473,153 | Lager | June 12, 1949 |

OTHER REFERENCES

Modern Plastics, November 1946, page 98.